(12) United States Patent
Haratake

(10) Patent No.: US 10,907,588 B2
(45) Date of Patent: Feb. 2, 2021

(54) STRUCTURE OF ENGINE INTAKE DUCT

(71) Applicant: Toyota Jidosha Kabushiki Kaisha, Toyota (JP)

(72) Inventor: Kotaro Haratake, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/729,956

(22) Filed: Dec. 30, 2019

(65) Prior Publication Data
US 2020/0224616 A1 Jul. 16, 2020

(30) Foreign Application Priority Data
Jan. 11, 2019 (JP) .................................. 2019-003459

(51) Int. Cl.
*F02M 35/10* (2006.01)
*F15D 1/04* (2006.01)
*F02M 35/12* (2006.01)

(52) U.S. Cl.
CPC ..... *F02M 35/10118* (2013.01); *F02M 35/10262* (2013.01); *F02M 35/1216* (2013.01); *F15D 1/04* (2013.01)

(58) Field of Classification Search
CPC ....... F02M 35/10262; F02M 35/10118; F02M 35/1216; F15D 1/04
See application file for complete search history.

(56) References Cited

U.S. PATENT DOCUMENTS

| 3,623,511 A * | 11/1971 | Levin ................... F15D 1/04 138/39 |
| 5,213,138 A | 5/1993 | Presz |
| 2018/0023524 A1 | 1/2018 | Rikitake et al. |
| 2018/0345197 A1 | 12/2018 | Harada et al. |

FOREIGN PATENT DOCUMENTS

| DE | 102018112906 A1 | 12/2018 |
| JP | 2018-013061 A | 1/2018 |

* cited by examiner

*Primary Examiner* — Jacob M Amick
*Assistant Examiner* — Michael A Kessler
(74) *Attorney, Agent, or Firm* — Dinsmore & Shohl LLP

(57) ABSTRACT

An engine intake duct includes an upstream side linear portion, a bend portion, a downstream side linear portion, and a fin that rises from an inner surface of the bend portion on an inner side in a bend direction. A fin tip portion is located in the bend portion, and a fin rear end portion is located in the bend portion or the downstream side linear portion, and the fin includes a tip side inclined surface, a rear end side inclined surface, and a rear end surface that is a steep wall extending from a rear end of the rear end side inclined surface to the fin rear end portion. At least a part of a top of the tip side inclined surface of the fin is formed along an extension line of an inner surface of the upstream side linear portion toward the bend portion.

5 Claims, 6 Drawing Sheets

STRUCTURE OF ENGINE INTAKE DUCT

CROSS REFERENCE TO RELATED APPLICATION

This application claims priority to Japanese Patent Application No. 2019-003459 filed on Jan. 11, 2019, which is incorporated herein by reference in its entirety including the specification, claims, drawings, and abstracts.

TECHNICAL FIELD

The present disclosure relates to a structure of an engine intake duct that forms an intake flow path to guide air to an engine.

BACKGROUND

Examples of an engine intake duct that forms an intake flow path to guide air to an engine of a vehicle include an inlet duct and an air cleaner hose. Such a duct has a bent portion (also referred to as a bend portion), and the air flowing in the duct separates from an inner surface of the bend portion on an inner side in a bend direction when air passes the bend portion.

Due to the air separation, a flow velocity of air increases in a vicinity of the inner surface of the bend portion on an outer side in the bend direction, but the flow velocity of air decreases in the vicinity of the inner surface of the bend portion on the inner side in the bend direction. On a downstream side of the bend portion, the flow velocity of air in the duct is non-uniform. The non-uniformity of the air flow velocity in the duct might cause a decrease in an amount of air entering the engine. For example, a throttle valve is provided on a downstream side of the duct to incline a plate-shaped member provided in a flow path so that the flow path is closeable. Thus, a size of a gap between the plate-shaped member and an inner surface of the flow path is changed, to adjust an amount of air flowing toward a combustion chamber of the engine. Consequently, when air enters the gap between the plate-shaped member and the inner surface of the flow path at a low flow velocity, a desired amount of air cannot be sent to the combustion chamber of the engine.

To cope with a problem of air separation in a duct, in JP 2018-13061 A, there is disclosed a duct structure in which a fin is provided on an inner surface of a bend portion of the duct on an inner side in a bend direction or on an inner surface of a linear portion that is located on a downstream side of the inner surface of the bend portion on the inner side in the bend direction. The fin has a shape that rises from an inner surface of the duct and extends along an intake flow path. The fin includes a rear end surface that is a steep wall extending between a rear end of a fin top surface that is located at a position higher than the inner surface of the duct and a fin rear end portion that is located in the inner surface of the duct. When air flows along the fin top surface and passes the rear end of the fin top surface, a vortex is generated behind the rear end surface of the fin. A portion in which the vortex is generated has a pressure lower than a pressure in a region around the vortex. Therefore, the air around the vortex is attracted toward the vortex (the inner surface of the duct on the inner side in the bend direction). In consequence, it is possible to inhibit air separation from the inner surface of the bend portion on the inner side in the bend direction.

SUMMARY

In a duct structure described in JP 2018-13061 A, a position or a structure of a fin to a linear portion of a duct which is located on an upstream side of a bend portion of the duct has not been sufficiently studied. Depending on the position or the structure of the fin to the linear portion, air separation from an inner surface of the bend portion of the duct on an inner side in a bend direction cannot be sufficiently inhibited.

It is an advantage of the present disclosure to provide a structure of an engine intake duct that forms an intake flow path to guide air to an engine, in which consideration is given to a position or a structure of a fin to a linear portion of the duct that is located on an upstream side of a bend portion of the duct, so that it is possible to effectively inhibit air separation that occurs on an inner surface of the bend portion of the duct on an inner side in a bend direction in the structure of the engine intake duct.

A structure of an engine intake duct according to the present disclosure is a structure of an engine intake duct that forms an intake flow path to guide air to an engine, the structure including an upstream side linear portion, a bend portion, and a downstream side linear portion in order from an upstream side, and further including a fin that rises from an inner surface of the duct including an inner surface of the bend portion on an inner side in a bend direction and extends along the intake flow path, wherein a fin tip portion that is a tip of the fin is located in the bend portion, a fin rear end portion that is a rear end of the fin is located in the bend portion or the downstream side linear portion, the fin includes a tip side inclined surface that ascends and inclines from the fin tip portion to a downstream side, a rear end side inclined surface that descends and inclines to the downstream side behind the tip side inclined surface, and a rear end surface that is a steep wall extending from a rear end of the rear end side inclined surface located at a position higher than the inner surface of the duct to the fin rear end portion located in the inner surface of the duct, and at least a part of a top of the tip side inclined surface of the fin is formed along an extension line of an inner surface of the upstream side linear portion toward the bend portion.

According to this configuration, at least a part of the top of the tip side inclined surface of the fin is formed along the extension line of the inner surface of the upstream side linear portion toward the bend portion in the duct, thereby allowing a lot of air that proceeds from the upstream side linear portion to the bend portion in the duct to proceed along the tip side inclined surface of the fin while suppressing pressure loss. Then, a lot of air proceeds along the rear end side inclined surface and passes a rear end of the surface, so that strong vortex may be generated behind the rear end surface of the fin. A portion in which the vortex is generated has a pressure lower than a pressure of a region around the vortex, and the stronger vortex causes the lower pressure. Consequently, a lot of air around the vortex may be attracted toward the vortex (the inner surface of the duct on the inner side in the bend direction), and it is possible to effectively inhibit air separation from the inner surface of the bend portion of the duct on the inner side in the bend direction. In consequence, bias of flow of air in the duct (a non-uniform air flow velocity) may be suppressed, and an amount of intake air to the engine may be increased.

Furthermore, in the structure of the engine intake duct of the present disclosure, the fin may include a highest portion that protrudes highest from the inner surface of the duct between the tip side inclined surface and the rear end side inclined surface, and the highest portion of the fin may be located on the extension line of the upstream side linear portion.

According to this configuration, the air that proceeds from the upstream side linear portion to the bend portion in the duct reaches the highest portion of the fin as it is. Consequently, a lot of air flows along the rear end side inclined surface that is located behind the highest portion of the fin, and may generate a stronger vortex behind the rear end surface of the fin. Consequently, a lot of air may be attracted toward the vortex, and it is possible to precisely inhibit the air separation from the inner surface of the bend portion in the duct on the inner side in the bend direction.

Furthermore, in the structure of the engine intake duct of the present disclosure, the fin may include a highest portion that protrudes highest from the inner surface of the duct between the tip side inclined surface and the rear end side inclined surface, and the highest portion of the fin may be located on an inner side of the extension line of the upstream side linear portion in the bend direction of the bend portion.

According to this configuration, the pressure loss of the fin to the air that proceeds from the upstream side linear portion to the bend portion in the duct may be decreased.

Furthermore, in the structure of the engine intake duct of the present disclosure, in the fin, a width in an orthogonal direction orthogonal to an extending direction of the intake flow path may change in accordance with a position in the extending direction. In the tip side inclined surface of the fin, a width in the orthogonal direction may gradually increase from the fin tip portion toward the downstream side, and in the rear end side inclined surface of the fin, a width in the orthogonal direction may gradually decrease from a side of the tip side inclined surface toward the downstream side.

According to this configuration, the width of the tip side inclined surface (the width in the orthogonal direction orthogonal to the extending direction of the intake flow path) gradually increases from the fin tip portion toward the downstream side. Consequently, the pressure loss of the fin to the air that proceeds from the upstream side linear portion to the bend portion in the duct is suppressed, and a lot of air flows along a rear end side (the downstream side) of the broadened tip side inclined surface. Then, the width of the rear end side inclined surface gradually decreases from the tip side inclined surface side toward the downstream side, and the vortex is generated on the rear end surface of the fin. Consequently, a lot of air that flows along the tip side inclined surface is gathered together toward the downstream side of the rear end side inclined surface. Then, the gathered air passes the rear end of the rear end side inclined surface, and hence the vortex generated behind the rear end surface of the fin is strengthened. Consequently, further air is gathered together toward the rear end of the rear end side inclined surface. Thus, the vortex is synergistically strengthened. Through the strong vortex, a lot of air may be attracted to the inner surface of the bend portion of the duct on the inner side in the bend direction, and hence it is possible to precisely inhibit the air separation from the inner surface of the duct.

Furthermore, in the structure of the engine intake duct of the present disclosure, a descending inclination angle of the rear end side inclined surface of the fin may be moderate as compared to an ascending inclination angle of the tip side inclined surface of the fin.

According to this configuration, a lot of air that proceeds from the tip side inclined surface to the rear end side inclined surface in the fin does not come away from the rear end side inclined surface and proceeds along the rear end side inclined surface. Consequently, the strong vortex may be generated behind the rear end surface of the fin. In consequence, a lot of air may be attracted to the inner surface of the bend portion of the duct on the inner side in the bend direction, and it is possible to precisely inhibit the air separation from the duct inner surface.

According to the present disclosure, in the engine intake duct that forms the intake flow path to guide air to the engine, it is possible to effectively inhibit the air separation that occurs on the inner surface of the bend portion of the duct on the inner side in the bend direction. In consequence, a flow velocity of air in the duct is made more uniform, and hence the amount of the intake air to the engine may be increased.

BRIEF DESCRIPTION OF DRAWINGS

Embodiment(s) of the present disclosure will be described based on the following figures, wherein.

DESCRIPTION OF EMBODIMENTS

Hereinafter, with reference to the drawings, description will be made to as to an embodiment of a structure of an engine intake duct according to the present disclosure. Similar elements in all the drawings are denoted with the same reference signs, and redundant description is omitted.

Figure 1:
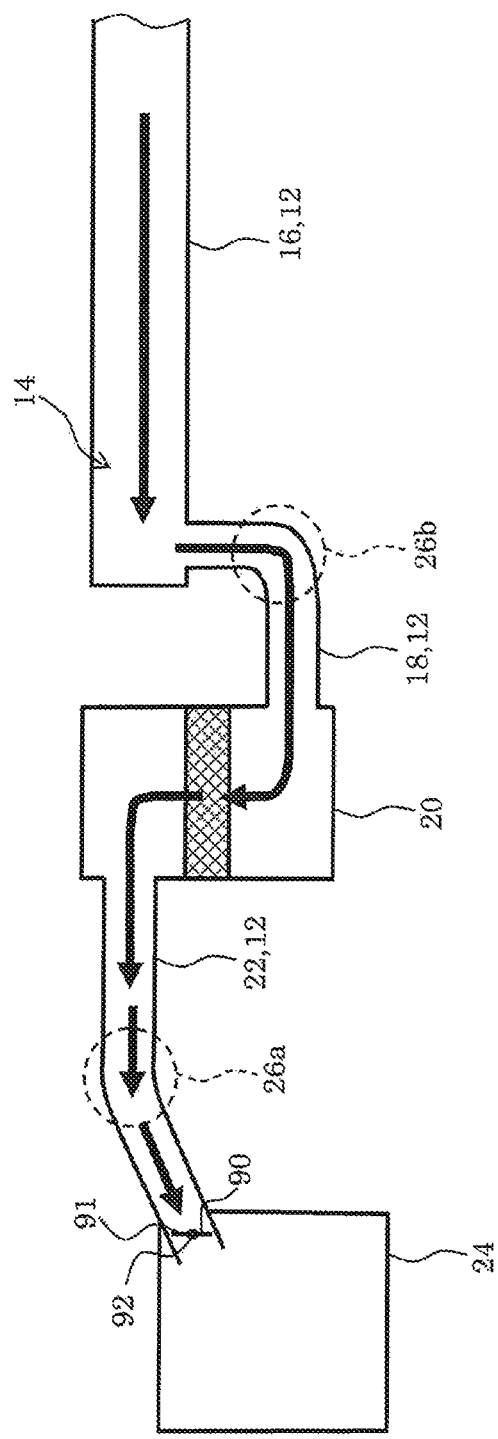
FIG. 1 is a schematic view showing an example of an intake flow path of an engine of a vehicle.

FIG. 1 is a schematic view showing an example of an intake flow path 14 that guides air to an engine 24 of a vehicle, and showing an air flowing direction with bold black arrows. As shown in FIG. 1, a first inlet duct 16, a second inlet duct 18, an air cleaner 20, and an air cleaner hose 22 are arranged in order from an upstream side, thereby forming the intake flow path 14 of the engine 24. Air proceeds from the first inlet duct 16 to the second inlet duct 18, and is exhausted through the air cleaner 20 to the air cleaner hose 22 and guided from the air cleaner hose 22 into the engine 24. Here, each of the first inlet duct 16, the second inlet duct 18, and the air cleaner hose 22 can be referred to as an engine intake duct 12 and will be hereinafter referred to simply as a duct.

The engine 24 includes a throttle valve 90, and the throttle valve 90 is disposed in the intake flow path 14 on a downstream side of the air cleaner hose 22. By the throttle valve 90, a plate-shaped member 91 provided in the flow path so that the flow path is closeable is inclined about an axis 92, and a size of a gap between the plate-shaped member 91 and a flow path inner surface is changed, to thereby adjust an amount of air toward a combustion chamber of the engine.

The air cleaner hose 22 has a bend section 26a, and similarly the second inlet duct 18 has a bend section 26b. In these bend sections 26a, 26b, air separates from an inner surface of the duct on an inner side in a bend direction. A flow velocity of air increases in a vicinity of the inner surface of the duct on an outer side in the bend direction, while the flow velocity of air decreases in the vicinity of the inner surface of the duct on the inner side in the bend direction. On a downstream side of the bend section 26a, 26b, the flow velocity of air in the duct is non-uniform. Then, air flows at a low flow velocity in a gap between the plate-shaped member 91 of the throttle valve 90 and the flow path inner surface, and hence an amount of intake air of the engine 24 decreases. To solve the problem, in the present embodiment, a fin is provided in each bend section 26a, 26b, and air is inhibited from separating from the inner surface of the duct on the inner side in the bend direction, to thereby increase the amount of the intake air of the engine 24. Hereinafter, description will be made in detail as to each bend section 26a, 26b of the present embodiment.

Figure 2:
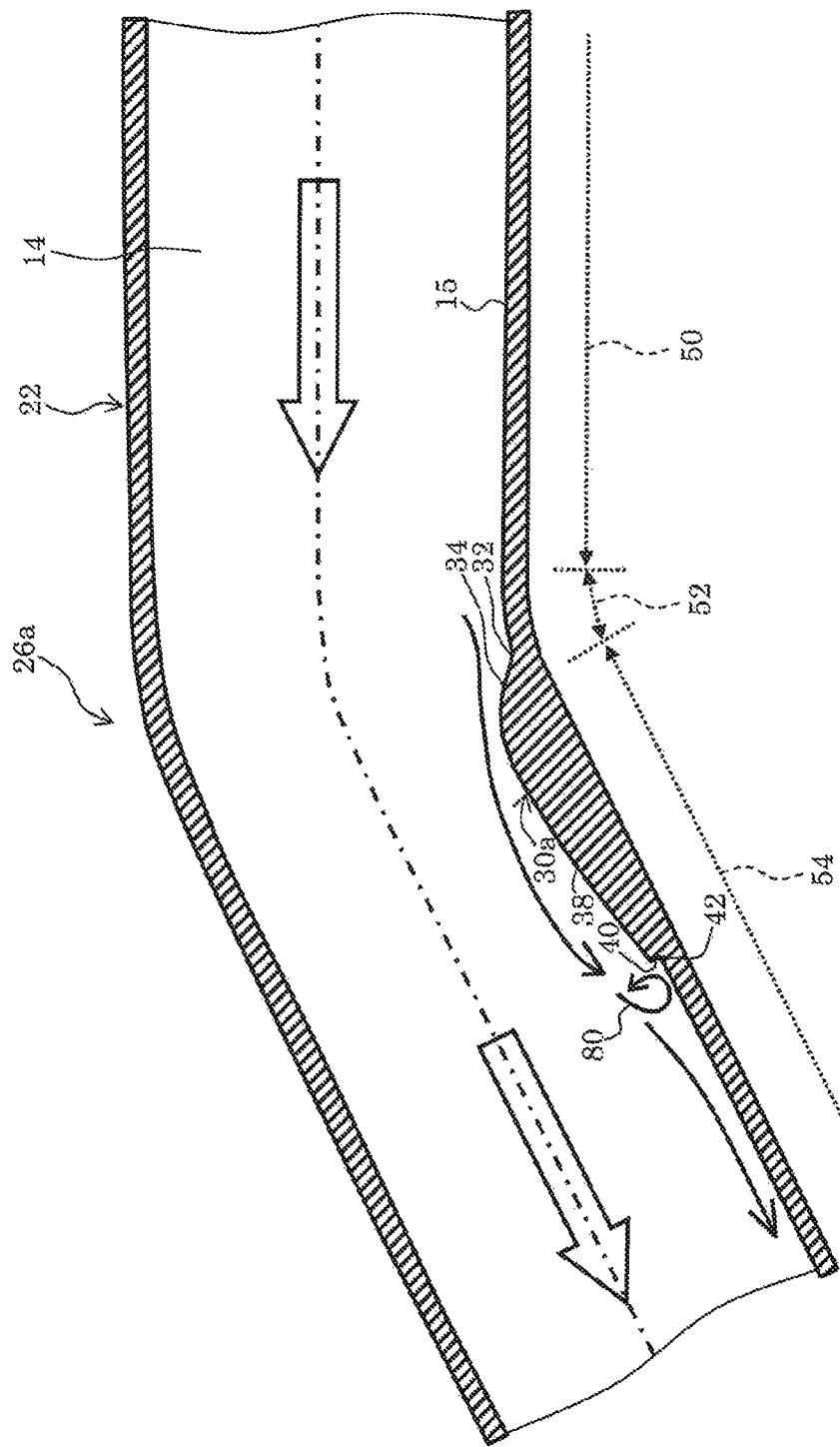
FIG. 2 is a sectional view of a bend section of an air cleaner hose.

Firstly, the bend section 26a of the air cleaner hose 22 will be described. FIG. 2 is a sectional view of the bend section 26a of the air cleaner hose 22, and shows an air flow direction with white arrows. The air cleaner hose 22 is a perfectly circular tube (see FIG. 4), and includes an upstream side linear portion 50, a bend portion 52, and a downstream side linear portion 54 in order from the upstream side as shown in FIG. 2. Furthermore, the air cleaner hose 22 includes a fin 30a that rises from an inner surface of the bend portion 52 on the inner side in the bend direction and an inner surface of the downstream side linear portion 54 that is located on the downstream side of the bend portion, and extends along the intake flow path 14. The fin 30a is formed integrally with the air cleaner hose 22.

Figure 3:
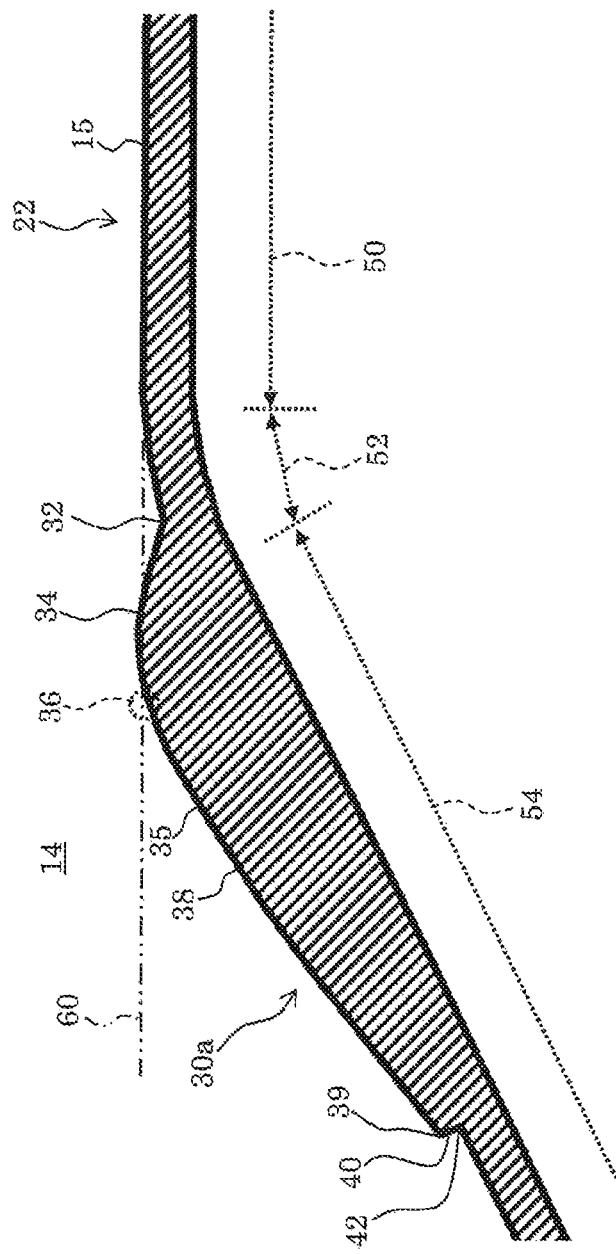
FIG. 3 is an enlarged view of a fin of the air cleaner hose.
Figure 4:
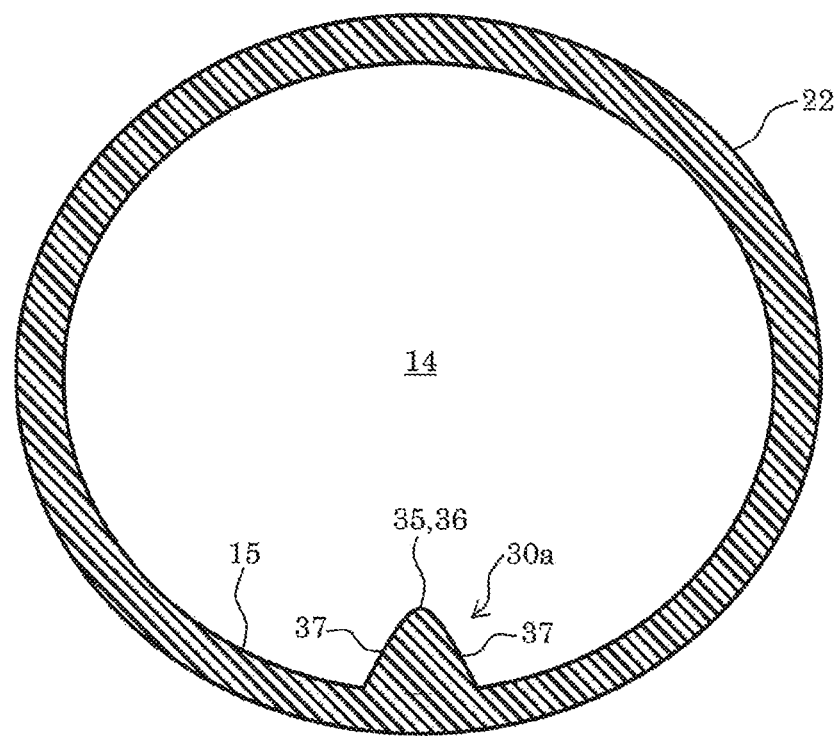
FIG. 4 is a cross sectional view of the air cleaner hose.
Figure 5:
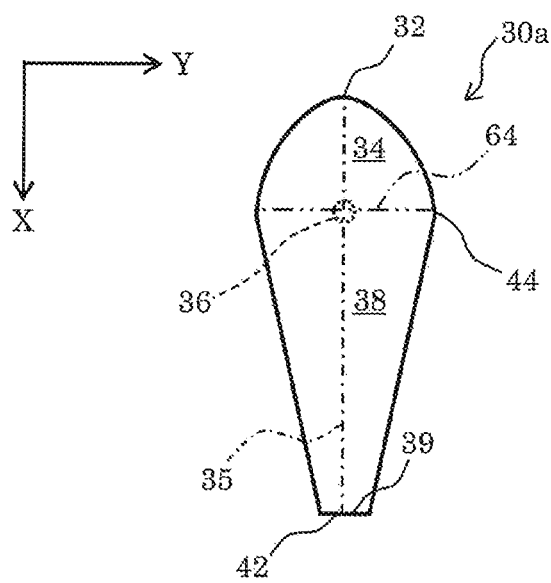
FIG. 5 is a plan view of the fin of the air cleaner hose.

FIG. 3 is an enlarged view of the fin 30a shown in FIG. 2, FIG. 4 is a cross sectional view of the air cleaner hose 22 in a highest portion (a highest portion 36) of the fin 30a, and FIG. 5 is a plan view of the fin 30a. As shown in FIG. 3, a fin tip portion 32 that is a tip of the fin 30a is located in the bend portion 52, and a fin rear end portion 42 that is a rear end of the fin 30a is located in the downstream side linear portion 54. The fin 30a includes a tip side inclined surface 34 that ascends and inclines from the fin tip portion 32 toward a rear side (the downstream side), and a rear end side inclined surface 38 that descends and inclines to the downstream side behind the tip side inclined surface 34. A length of the rear end side inclined surface 38 in an extending direction of the intake flow path (hereinafter also referred to as a flow path direction) is greater than a length of the tip side inclined surface 34 in the flow path direction, and a descending inclination angle of the rear end side inclined surface 38 is moderate as compared to an ascending inclination angle of the tip side inclined surface 34. The highest portion 36 that protrudes highest from an inner surface 15 of the air cleaner hose 22 is located between the tip side inclined surface 34 and the rear end side inclined surface 38.

As shown in FIG. 3, a part of a ridge portion (hereinafter referred to as a top 35) of the tip side inclined surface 34 of the fin 30a is formed along an extension line 60 of the inner surface 15 of the upstream side linear portion 50 toward the bend portion 52 in the air cleaner hose 22. Furthermore, the highest portion 36 of the fin 30a is located on the extension line 60 of the upstream side linear portion 50 of the air cleaner hose 22, and located at a tip of the top 35 of the tip side inclined surface 34 of the fin 30a along the extension line 60.

A rear end 39 of the rear end side inclined surface 38 is located at a position higher than the inner surface 15 of the air cleaner hose 22, and the fin rear end portion 42 is located on the inner surface 15 of the air cleaner hose 22. The fin 30a includes a rear end surface 40 that is a steep wall extending from the rear end 39 of the rear end side inclined surface 38 to the fin rear end portion 42.

As shown in FIG. 4, a vertical section of the fin 30a (a section in a case where the fin is cut in a direction orthogonal to the extending direction of the intake flow path) has a substantially triangular shape. The fin 30a includes the top 35 having a smooth tip (the highest portion 36 in FIG. 4), and two opposite side portions 37 extending from the inner surface 15 of the air cleaner hose 22 toward the top 35. As shown in FIG. 3, a position (a height) of the top 35 of the fin 30a to the inner surface 15 of the air cleaner hose 22 decreases from the highest portion 36 toward the fin tip portion 32 or the fin rear end portion 42.

As shown in FIG. 5 (the plan view), in the fin 30a, a width in an orthogonal direction (a Y-direction shown in FIG. 5, hereinafter referred to also as a fin short direction) orthogonal to the extending direction of the intake flow path (an X-direction shown in FIG. 5, hereinafter referred to also as a fin longitudinal direction) changes in accordance with a position in the fin longitudinal direction. In the tip side inclined surface 34 of the fin 30a, a width in the fin short direction (the Y-direction) gradually increases from the fin tip portion 32 toward the downstream side (a lower side in FIG. 5), while in the rear end side inclined surface 38 of the fin 30a, a width in the fin short direction (the Y-direction) gradually decreases from a tip side inclined surface 34 side toward the downstream side. The fin 30a includes a widest portion 44 having the largest width in the fin short direction (the Y-direction), at a position between the tip side inclined surface 34 and the rear end side inclined surface 38 (a boundary 64 between the tip side inclined surface 34 and the rear end side inclined surface 38 in the present embodiment). As shown in FIG. 5, the widest portion 44 of the fin 30a is located at the same position as in the highest portion 36. The rear end 39 of the rear end side inclined surface 38 is cut along the fin short direction, and has a predetermined width in the fin short direction.

Next, description will be given as to technological effects of the bend section 26a of the above described air cleaner hose 22.

In the above described air cleaner hose 22, as shown in FIG. 3, a part of the top 35 of the tip side inclined surface 34 of the fin 30a is formed along the extension line 60 of the inner surface 15 of the upstream side linear portion 50 toward the bend portion 52 in the air cleaner hose 22. Consequently, as shown by bold black arrows (flow of air) of FIG. 2, a lot of air that proceeds from the upstream side linear portion 50 to the bend portion 52 in the air cleaner hose 22 is allowed to proceed along the tip side inclined surface 34 of the fin 30a while suppressing pressure loss. Then, a lot of air proceeds along the rear end side inclined surface 38 and passes the rear end of the surface, and can thereby generate a strong vortex 80 behind the rear end surface 40 of the fin 30a. A portion in which the vortex 80 is generated has a pressure lower than a pressure of a region around the vortex 80, and the stronger vortex 80 causes the lower pressure. Consequently, a lot of air around the vortex 80 can be attracted toward the vortex 80 (the inner surface 15 of the air cleaner hose 22 on the inner side in the bend direction), and it is possible to effectively inhibit air separation from the inner surface 15 of the bend portion 52 of the air cleaner hose 22 on the inner side in the bend direction. In consequence, bias of flow of air in the air cleaner hose 22 (a non-uniform air flow velocity) can be suppressed, and an amount of intake air to the engine can be increased.

Furthermore, in the above described air cleaner hose 22, as shown in FIG. 3, the highest portion 36 of the fin 30a is located between the tip side inclined surface 34 and the rear end side inclined surface 38, and located on the extension line 60 of the inner surface 15 of the upstream side linear portion 50 toward the bend portion 52 in the air cleaner hose 22. Thus, the air that proceeds from the upstream side linear portion 50 to the bend portion 52 in the air cleaner hose 22 reaches the highest portion 36 of the fin 30a as it is. Consequently, a lot of air flows along the rear end side inclined surface 38 that is located behind the highest portion 36 of the fin 30a, and can generate the stronger vortex 80 (see FIG. 2) behind the rear end surface 40 of the fin 30a. Consequently, a lot of air can be attracted toward the vortex 80, and it is possible to precisely inhibit the air separation from the inner surface 15 of the bend portion 52 of the air cleaner hose 22 on the inner side in the bend direction.

Furthermore, in the above described air cleaner hose 22, as shown in FIG. 5, the width of the tip side inclined surface 34 of the fin 30a in the fin short direction (the Y-direction) gradually increases from the fin tip portion 32 toward the downstream side (the lower side of FIG. 5). Consequently, the pressure loss of the fin 30a to the air that proceeds from the upstream side linear portion to the bend portion in the air cleaner hose is suppressed, and a lot of air flows along a rear end side (the downstream side) of the broadened tip side inclined surface 34. Furthermore, the width of the rear end side inclined surface 38 of the fin 30a in the fin short direction (the Y-direction) gradually decreases from the tip side inclined surface 34 side toward the downstream side, and the vortex is generated on the rear end surface of the fin 30a as described above. Consequently, a lot of air that flows along the tip side inclined surface 34 is gathered together toward the downstream side of the rear end side inclined surface 38. Then, the gathered air passes the rear end 39 of the rear end side inclined surface 38, and hence the vortex 80 (see FIG. 2) generated behind the rear end surface of the fin 30a is strengthened. Thus, further air is gathered together toward the rear end of the rear end side inclined surface 38. In this manner, the vortex 80 is synergistically strengthened. Through the strong vortex 80, a lot of air can be attracted to the inner surface 15 of the bend portion of the air cleaner hose 22 on the inner side in the bend direction, and hence it is possible to precisely inhibit the air separation from the inner surface of the air cleaner hose 22.

Furthermore, in above described air cleaner hose 22, as shown in FIG. 2, the descending inclination angle of the rear end side inclined surface 38 of the fin 30a is moderate as compared to the ascending inclination angle of the tip side inclined surface 34 of the fin 30a. Consequently, a lot of air that proceeds from the tip side inclined surface 34 to the rear end side inclined surface 38 in the fin 30a does not come away from the rear end side inclined surface 38 and proceeds along the rear end side inclined surface 38. Therefore, the strong vortex 80 can be generated behind the rear end surface 40 of the fin 30a. In consequence, a lot of air can be attracted to the inner surface of the bend portion of the air cleaner hose 22 on the inner side in the bend direction, and it is possible to precisely inhibit the air separation from the inner surface of the air cleaner hose 22.

Next, description will be given as to the bend section 26b of the second inlet duct 18 shown in FIG. 1.

Figure 6:
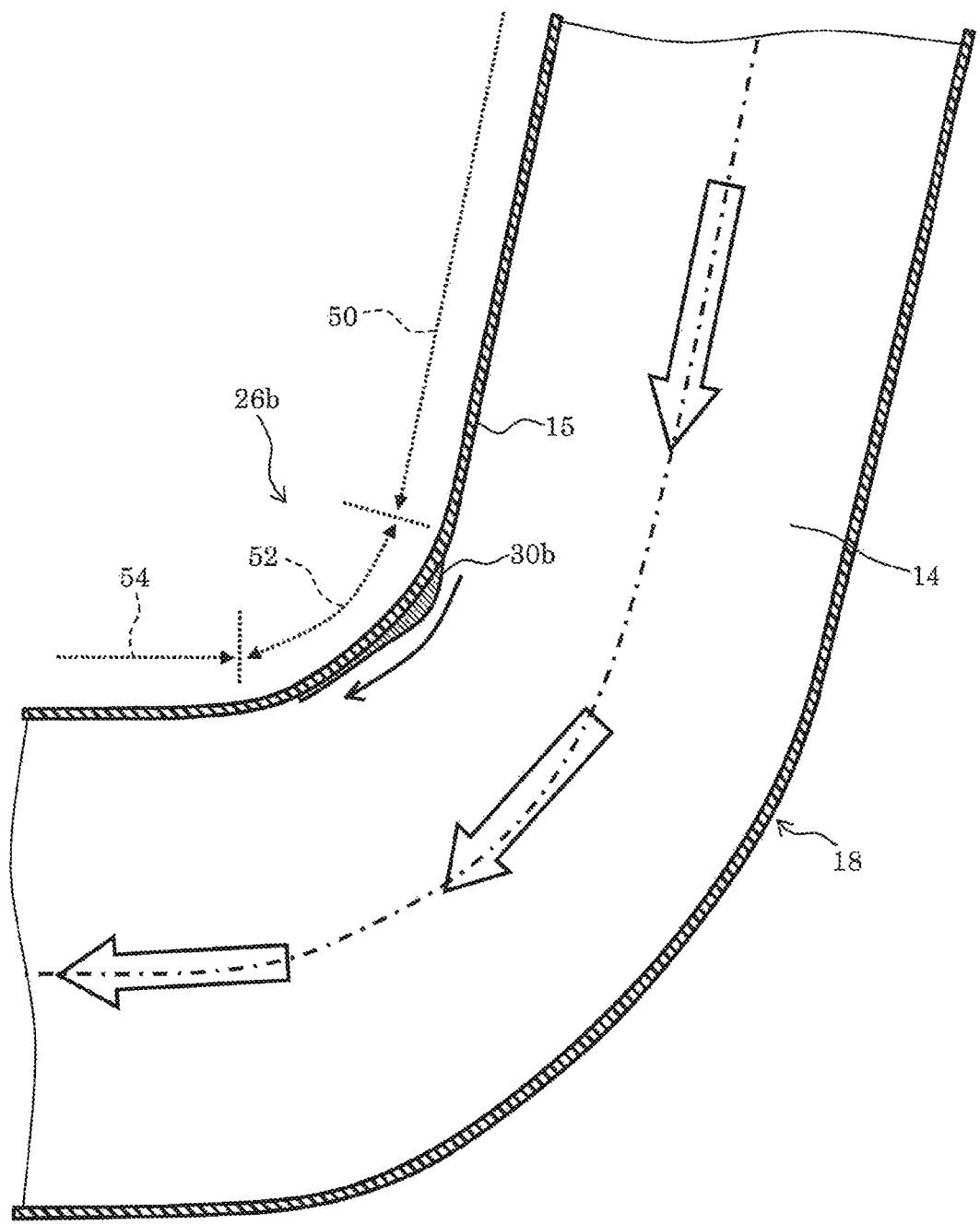
FIG. 6 is a sectional view of a bend section of a second inlet duct.

FIG. 6 is a sectional view of the bend section 26b of the second inlet duct 18, and shows an air flowing direction with white arrows. Similarly to the above described air cleaner hose 22, the second inlet duct 18 is also a perfectly circular tube, and includes an upstream side linear portion 50, a bend portion 52, and a downstream side linear portion 54 in order from the upstream side. A bend angle of the second inlet duct 18 is larger than that of the air cleaner hose 22, and a length of the bend portion 52 increases. Accordingly, a length of a fin 30b of the second inlet duct 18 in an extending direction of the intake flow path 14 is larger than that of the fin 30a of the air cleaner hose 22. The fin 30b is formed integrally with the second inlet duct 18.

Figure 7:
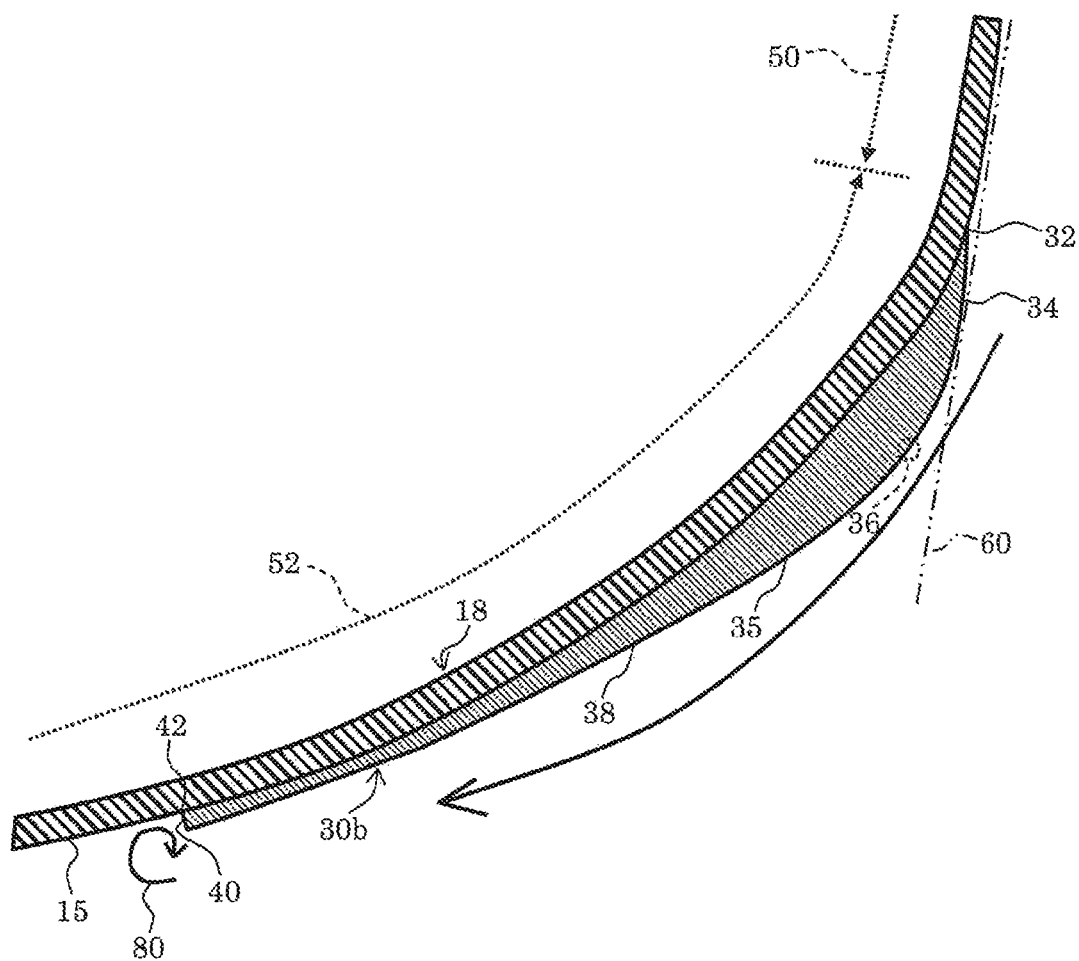
FIG. 7 is an enlarged view of a fin of the second inlet duct.

FIG. 7 is an enlarged view of the fin 30b shown in FIG. 6. A structure of the fin 30b of the second inlet duct 18 is similar to the above described structure of the fin 30a of the air cleaner hose 22, but is little different therefrom in fin position. Specifically, the fin 30b of the second inlet duct 18 rises from the inner surface of the bend portion 52 on the inner side in the bend direction, and does not extend to the downstream side linear portion 54 (see FIG. 6). Furthermore, as shown in FIG. 7, both the fin tip portion 32 and the fin rear end portion 42 are located in the bend portion 52 of the second inlet duct 18. Furthermore, a highest portion 36 of the fin 30b is different from the highest portion 36 of the fin 30a of the above described air cleaner hose 22 in that the highest portion is located on an inner side of an extension line 60 of an inner surface of the upstream side linear portion 50 toward the bend portion 52 in a bend direction of the bend portion 52.

As shown in FIG. 7, the second inlet duct 18 is similar to the above described air cleaner hose 22 in that a part of a top 35 of a tip side inclined surface 34 of the fin 30b is formed along the extension line 60 of the inner surface of the upstream side linear portion 50 toward the bend portion 52 in the second inlet duct 18. Consequently, as shown by a bold black arrow (flow of air) of FIG. 7, a lot of air that proceeds from the upstream side linear portion 50 to the bend portion 52 in the second inlet duct 18 is allowed to proceed along the tip side inclined surface 34 of the fin 30b while suppressing the pressure loss. Then, a lot of air proceeds along a rear end side inclined surface 38 and passes a rear end of the surface, and can thereby generate a strong vortex 80 behind a rear end surface 40 of the fin 30b. A portion in which the vortex 80 is generated has a pressure lower than a pressure of a region around the vortex 80, and the stronger vortex 80 causes the lower pressure. Consequently, a lot of air around the vortex 80 can be attracted toward the vortex 80 (an inner surface 15 of the second inlet duct 18 on the inner side in the bend direction), and it is possible to effectively inhibit air separation from the inner surface 15 of the bend portion 52 of the second inlet duct 18 on the inner side in the bend direction. In consequence, bias of the flow of air in the second inlet duct 18 (a non-uniform air flow velocity) is suppressed.

Next, a modification will be described. For the above described ducts (the air cleaner hose 22 and the second inlet duct 18), the duct and the fin are integrally formed. However, the fin may be separate from the duct. For example, the fin may be attached to the duct with an adhesive.

Furthermore, in the above described duct, a part of the top 35 of the tip side inclined surface 34 of the fin is formed along the extension line 60 of the inner surface 15 of the upstream side linear portion 50 toward the bend portion 52 in the duct. However, the entirety of the top 35 of the tip side inclined surface 34 of the fin may be formed along the extension line 60 of the upstream side linear portion 50.

The invention claimed is:

1. A structure of an engine intake duct that forms an intake flow path to guide air to an engine, the structure comprising an upstream side linear portion, a bend portion, and a downstream side linear portion in order from an upstream side, and further comprising a fin that rises from an inner surface of the duct including an inner surface of the bend portion on an inner side in a bend direction and extends along the intake flow path, wherein a fin tip portion that is a tip of the fin is located in the bend portion, and a fin rear end portion that is a rear end of the fin is located in the bend portion or the downstream side linear portion, the fin comprises a tip side inclined surface that ascends and inclines from the fin tip portion to a downstream side, a rear end side inclined surface that descends and inclines to the downstream side behind the tip side inclined surface, and a rear end surface that is a steep wall extending from a rear end of the rear end side inclined surface located at a position higher than the inner surface of the duct to the fin rear end portion located in the inner surface of the duct, and at least a part of a top of the tip side inclined surface of the fin is formed along an extension line of an inner surface of the upstream side linear portion toward the bend portion.

2. The structure of the engine intake duct according to claim 1, wherein the fin comprises a highest portion that protrudes highest from the inner surface of the duct between the tip side inclined surface and the rear end side inclined surface, and the highest portion of the fin is located on the extension line of the upstream side linear portion.

3. The structure of the engine intake duct according to claim 1, wherein the fin comprises a highest portion that protrudes highest from the inner surface of the duct between the tip side inclined surface and the rear end side inclined surface, and the highest portion of the fin is located on an inner side of the extension line of the upstream side linear portion in the bend direction of the bend portion.

4. The structure of the engine intake duct according to claim 2, wherein in the fin, a width in an orthogonal direction orthogonal to an extending direction of the intake flow path changes in accordance with a position in the extending direction, in the tip side inclined surface of the fin, a width in the orthogonal direction gradually increases from the fin tip portion toward the downstream side, and in the rear end side inclined surface of the fin, a width in the orthogonal direction gradually decreases from a side of the tip side inclined surface toward the downstream side.

5. The structure of the engine intake duct according to claim 4, wherein a descending inclination angle of the rear end side inclined surface of the fin is moderate as compared to an ascending inclination angle of the tip side inclined surface of the fin.

* * * * *